March 21, 1939.   E. A. W. BEEMER   2,151,414
SEEDING APPARATUS
Filed May 15, 1937   2 Sheets-Sheet 1
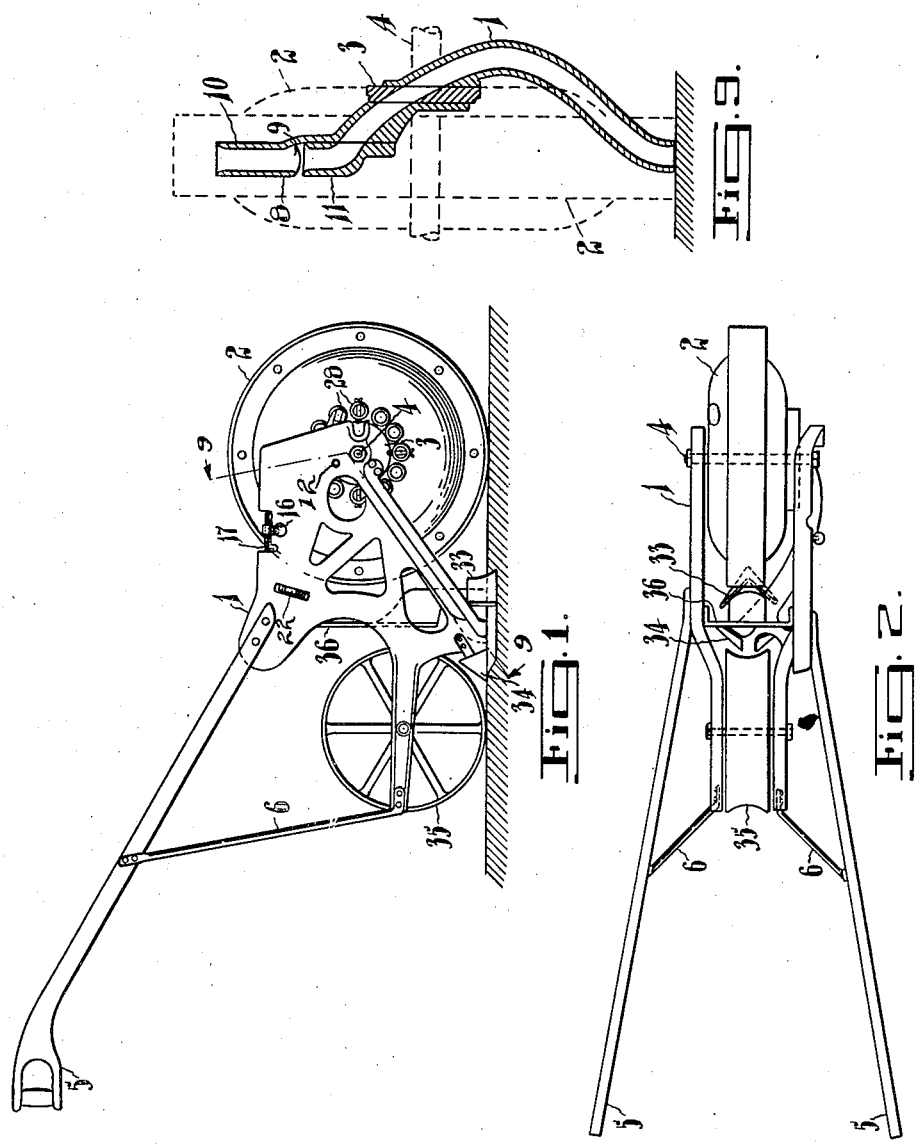
Inventor
E. A. W. Beemer
By J. Edw. Mayba
ATTY March 21, 1939. E. A. W. BEEMER 2,151,414
SEEDING APPARATUS
Filed May 15, 1937 2 Sheets-Sheet 2

Inventor
E. A. W. Beemer
by J. Edw Maybee
ATTY

Patented Mar. 21, 1939

2,151,414

UNITED STATES PATENT OFFICE 2,151,414

SEEDING APPARATUS

Elias A. W. Beemer, Langstaff, Ontario, Canada, assignor of one-half to Murray H. Blandin, Toronto, Ontario, Canada Application May 15, 1937, Serial No. 142,735

15 Claims. (Cl. 111—74)

This invention relates particularly to apparatus adapted to sow garden seeds.

It is particularly difficult to provide one machine which will satisfactorily sow all varieties of garden seeds owing to the great differences in the size, shape and specific gravity of the seeds. My object in the present invention therefore is to provide a machine which will come nearer to the ideal than most of the machines on the market and will do so without the use of interchangeable seed disks.

I attain my object by means of the constructions which may be briefly described as follows.

A seed reservoir is provided with means for lifting the seed from the bottom of the reservoir and dropping it from the top and with movable means adapted to split the falling stream of seed into two parts and adjustable to vary the ratio of flow in the two parts. Means are also provided for leading one part of the flow of seed to a sowing position.

It is found in practice that it is much easier to accurately separate the desired quantity of seed from a quickly moving stream than it is to cause seed from a more or less stationary mass to pass into and through seed openings or pockets. Preferably I divide the falling stream of seed by means of an adjustable intercepting device which may be set to intercept more or less of the falling seed and deliver it to a spout part leading to the sowing position.

Means are also provided, including parts rotating in an orbit, for moving the intercepting device alternately between its adjusted position and one in which it intercepts no seed at all, this arrangement being used when seed is to be dropped at predetermined positions in a drill. The means just described are also adjustable to vary the spacing of the seed deposits.

Figure 3:
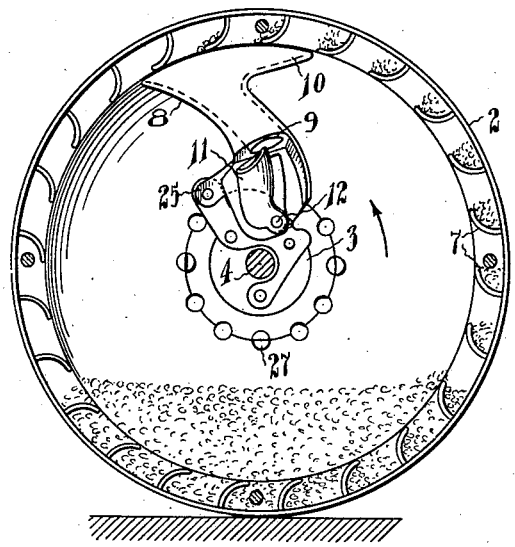
Figure 5:
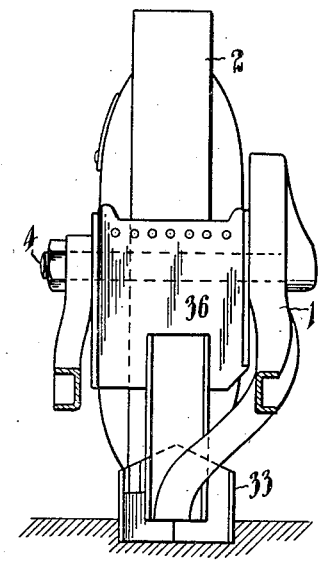
Figure 4:
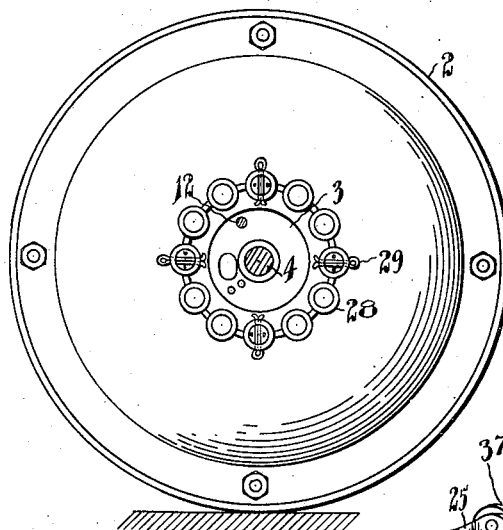
Figure 6:
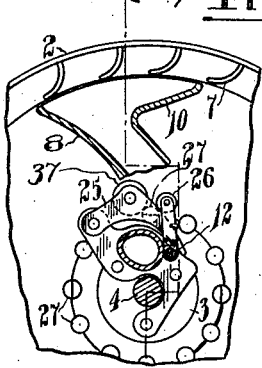
Figure 7:
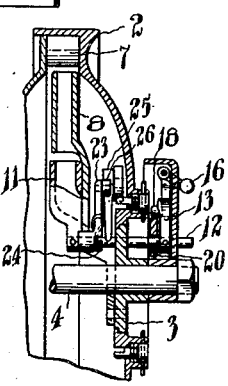
Figure 8:
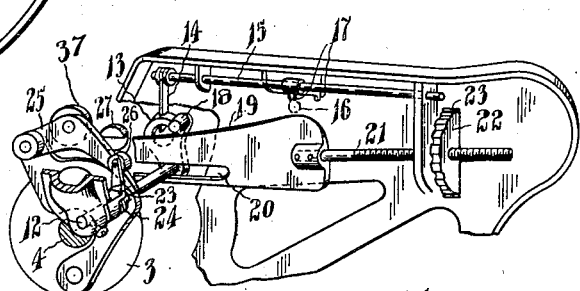
Figure 10:
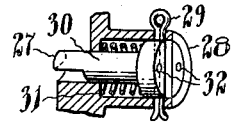

The invention is hereinafter more fully described and is illustrated in the accompanying drawings in which Fig. 1 is a side elevation of my improved seeding apparatus;

Fig. 2 a plan view of the same;

Fig. 3 a side elevation of the seed reservoir with its cover removed;

Fig. 4 a side elevation of the outer side of the seed reservoir;

Fig. 5 a rear elevation of the apparatus with the handles removed;

Fig. 6 a side elevation, partly in section, of part of the mechanism shown in Fig. 3;

Fig. 7 a section mainly on the line 7—7 in Fig. 6;

Fig. 8 a perspective detail of the interceptor operating and adjusting mechanism;

Fig. 9 a longitudinal section of the seed spout and interceptor taken generally on the line 9—9 in Fig. 1; and Fig. 10 a detail of one of the cam pins for actuating the mechanism for imparting to-and-fro movements to the interceptor.

In the drawings like numerals of reference indicate corresponding parts in the different figures.

1 is a forked frame which is suitably shaped to support the different parts. On this frame is rotatably supported the hollow reservoir 2, which is divided circumferentially and the parts suitably secured together. This reservoir is journalled on the bolt 4 which passes through opposite sides of the frame. The hollow reservoir is formed with an opening at one side, which is closed by the stationary plate 3 forming part of the frame 1. This plate serves to support parts within the hollow reservoir which do not rotate therewith.

5 are the handles which are suitably secured to the frame and are braced therefrom by the braces 6.

The interior of the periphery of the hollow reservoir is provided with the flights 7 which serve, as shown particularly in Figs. 3 and 6, to pick up seed contained within the reservoir from the bottom and drop it at the top so that, while the apparatus is in motion and is suitably supplied with seed, the latter is elevated and dropped in a continuous stream from the upper part of the hollow reservoir.

The following means are employed for intercepting more or less of the feed as it falls and for conveying it to the sowing point. For this purpose I provide the fixed spout 8 which opens through the plate 3 and is provided with the end 9 which discharges the seed at the sowing point. The upper part of the spout is carried by the plate 3 and is preferably provided with an upper end 10 which is elongated in the direction of the periphery of the hollow reservoir so as to catch substantially all the seed lifted by the flights and dropped at the top of the reservoir. Intermediate the two fixed parts of the feed spout is a movable intermediate spout part or interceptor 11. This part 11 is rigidly secured to the shaft 12 journalled in the plate 3. In the embodiment of the invention shown this intermediate spout part is of L-shape. The laterally directed part of its bore being always in communication with the spout part 8 while its upper end is adapted to intercept more or less of the seed falling down the part 10 of the spout according to the position to which the spout part 11 is moved by the operation of the shaft 12 to which it is secured. It is evident that by rocking the intermediate spout part 11 any desired quantity of the seed falling down the spout part 8 may be intercepted and fed to the lower part 9 of the spout.

To enable the position of the intermediate spout part 11 to be adjusted I provide the following mechanism. To the shaft 12 outside the frame is secured a rock arm 13. Spring tension may be applied to this rock arm to tend to move it in one direction or the other by means of the flat tension spring 14 which is secured at one end to the sliding rod 15, which is provided with a handle 16 operated through a slot in the adjacent part of the frame of the apparatus. This slot is provided with two notches 17 into which the handle may be dropped according as it is desired to yieldingly hold the rock arm 13 in either of two positions as hereinafter more fully described.

The rock arm 13 is provided with the lug 18, which is engageable with the upper edge of the inclined movable stop 19. If the spring 14 is in position to yieldingly press the rock arm 13 to the right in Fig. 8, the position of the rock arm, and therefore the shaft and therefore of the intermediate spout part 11 connected thereto, is determined by the part of the stop 19 engaged by the lug 18. The stop 19 is wedge shaped and is formed with the slot 20 embracing the shaft 12. It is thus rigidly supported against the pressure of the lug 18. The stop 19 is adjustable by means of the nut 22 which operates in a slot 23 formed in the side of the frame and is threaded on the stem 21 secured to the end of the stop 19. It is evident that by rotating the nut the inclined stop may be moved as desired. By adjusting the stop 19, the intercepting or open position of the intermediate spout part 11 may be adjusted to intercept more or less of the speed falling from the spout part 10 as may be necessary to suit different kinds of seed or to vary the quantity of the seed of any kind to be sown in a given length of drill. But any good seed sowing apparatus must be arranged to show not only in drills but at spaced intervals and the machine must be adjustable to vary the spacing. For this purpose I provide the mechanism which I will now describe.

An operating rock arm 23 is loosely connected with the rock shaft 12. This rock arm is given an operative connection with the shaft by means of the spring 24 arranged in a well known manner and adapted ordinarily to form a driving contact between the arm and the shaft but which nevertheless is adapted to yield if the pressure applied to the rock arm is sufficiently great. The free end of this rock arm is engageable by the free end of the lever 25 which is fulcrumed at its other end on the plate 3. Preferably the rock arm 23 is provided with the anti-friction roller 26 which contacts with the lever 25. Intermediate its ends the lever 25 is provided with an anti-friction roller 37 or other projection by means of which it may be rocked to actuate the rock arm to move the intermediate spout part 11 to a seed intercepting position. This operation of the lever 25 is effected through the medium of a circular series of cam pins 27 which are projected through the side of the hollow reservoir and are adjustable so that they are engageable or non-engageable with the roller 37 as may be desired.

The cam pins as will be seen particularly on reference to Figs. 4, 7 and 10 are cylindrical but have parts of their inner ends cut away. If the pins are positioned with the cut-away parts facing away from the axis of the hollow reservoir, the pins will not engage the roller 37, whereas if they are turned with the semi-cylindrical parts facing outward the roller will be engaged and the lever 25 rocked every time a cam pin passes underneath it. Thus at regular intervals the intermediate spout part 11 will be moved to its seed intercepting position and seed will pass down to the drill. It is evident that by turning any desired number of the pins 27 to the operative position the spacing of the deposit of seed may be varied as desired.

When sowing seed in a continuous flow the sliding rod 15 is moved to the right, referring to Fig. 8 and the position of the intermediate spout part is determined by the position of the inclined stop 19 against which the lug 18 on the rock lever 13 is pressed by the tension of the spring 14.

If it is desired to sow seed intermittently the sliding rod 15 is moved to the left in Fig. 8 and locked in that position by means of the handle 16. The spring 14 then tends to hold the intermediate spout part 11 in its closed position, that is the position in which no seed falling down the spout part 10 is intercepted. Every time, however, that a cam pin 27 which is in operative position passes under the roller 37 of the lever 25 the intermediate spout part 11 is moved to a position determined by the engagement of the lug 18 with the inclined surface of the stop 19. The extent of the movement is determined by adjusting the stop 19 so that any desired quantity of feed is intercepted at each movement of the spout part 11.

It is evident that the movement of the lever 25 by the cam pins 27 is a fixed amount, whereas the extent of movement permitted to the spout part 11 is set by the stop 19. Therefore the movement of the lever 25 will at times exceed that imparted to the intermediate spout part 11. This is taken care of by the spring 24 which yields to permit of the extra movement of the lever 25 taking place without breaking any of the parts.

The arrangement of the cam pins 27 is preferably as follows. See particularly Figs. 4, 7 and 10. Each pin is cylindrical and is provided with a cylindrical head having a transverse slot formed therein. Each pin is fitted in a cylindrical opening in the sides of the hollow reservoir and around each opening is formed a collar 28. Through this collar may be passed a cotter pin 29, which also passes through the slot in the head of the pin. The cotter pin thus serves to hold the pin in position with its inner end projecting beyond the inner side of the casing. As hereinbefore referred to the inner end of each pin has a cut-away portion 30. It is evident that by disengaging the cam pin from the cotter pin the latter may be turned to change the position of its inner end as hereinbefore referred to, the cotter pin serving to hold the cam pin in either position as desired.

To hold the cam pin as adjusted the opening through which the pin passes is counterbored to receive a coil spring 31 which bears against the shoulder in the opening of the frame and against the head of the cam pin. This spring tends to press the head of the cam pin outwardly into engagement with the cotter pin. It is preferred to form holes 32 in the end of each pin engageable by a tool by means of which the pin may be pressed in out of engagement with the cotter pin and turned till the slot is engageable with the cotter pin in a different position.

The apparatus is provided with the drill opener 33 which is of the usual V-type and which may be secured to the frame in any convenient manner. There is also provided the drag 34 having inclined sides which serve to fill in the drill. Any suitable form of drag may be employed as known in the art and may be secured to the frame of the apparatus in any convenient manner. Neither the drill opener nor the drag form any part of the present invention.

A rearward extension of the frame 1 carries the ground wheel 35 which compacts the earth filled in by the drag.

The frame also is provided with a plate 36 formed with a series of holes for the attachment of a row marker such as commonly employed in the art.

From the above description it will be seen that the modus operandi involved in my invention is to get the seed into active motion in a diffuse stream under the influence of gravity, to split the stream of seeds into two and to lead one part to the sowing point and the other part back to the reservoir. As I am enabled to use passages of relatively considerable area much more accurate measurement of seed quantities is possible than in apparatus in which the seed is forced through small holes or into and through small pockets and the shape or specific gravity of the seed has much less effect on the accuracy of the feed.

What I claim as my invention is:

1. In seeding apparatus the combination of a rotary seed reservoir adapted to be rotated as the apparatus is moved over the ground; a series of flights fixed to the interior of the reservoir adapted to raise seed contained in the reservoir and drop it from an elevation; a fixed seed conduit extending through one side of the reservoir to a delivery point and having its upper end positioned to receive seed dropped by the flights; and adjustable flow control means interposed in the part of the conduit within the reservoir whereby the seed entering the spout may be divided, more or less passing down the conduit to the delivery point and the remainder passing again into the reservoir.

2. In seeding apparatus the combination of a rotary seed reservoir adapted to be rotated as the apparatus is moved over the ground; a series of flights fixed to the interior of the reservoir adapted to raise seed contained in the reservoir and drop it from an elevation; and a fixed seed spout adapted to catch seed falling from the flights, a fixed spout part extending through the side of the reservoir to a delivery point and an intermediate movable spout part adjustable to catch more or less of the seed passing from the upper fixed part and direct it to the lower fixed part, the remainder passing back to the reservoir.

3. In seeding apparatus the combination of a rotary seed reservoir adapted to be rotated as the apparatus is moved over the ground; a series of flights fixed to the interior of the reservoir adapted to raise seed contained in the reservoir and drop it from an elevation; a fixed seed spout extending through one side of the reservoir to a delivery point and having its upper end positioned to receive seed dropped by the flights; and adjustable flow control means associated with the conduit whereby the seed falling from the flights may be divided, more or less passing down the spout to the delivery point and the remainder passing again into the reservoir.

4. Seeding apparatus according to claim 1 in which the flow control means is movable to and from its adjusted or open position and means are provided including parts rotating about the axis of the reservoir, for moving the flow control means alternately to and from its adjusted or open position.

5. Seeding apparatus according to claim 2 in which the movable spout part is movable to and from its adjusted or open position and means are provided, including parts rotating about the axis of the reservoir for moving the said spout part to and from its adjusted position.

6. Seeding apparatus according to claim 3 in which the flow control means is movable to and from its adjusted or open position and means are provided, including parts rotating about the axis of the reservoir for moving the said control means to and from its adjusted position.

7. Seeding apparatus according to claim 1 in which the adjusting means for the flow control means comprises a shaft journalled in a stationary part and to which shaft the flow control means is secured; a rock arm secured to the shaft; an adjustable stop engageable by the rock arm to limit the open position of the flow control; a spring; and means for tensioning the spring adapted to yieldingly hold the rock arm in engagement with the stop.

8. In seeding apparatus adapted to be propelled over the ground the combination of a seed reservoir; means whereby, as the apparatus is propelled seed is picked up from the bottom of the reservoir and dropped from the top in a continuous stream; movable means within the reservoir adapted to split the falling stream of seed into two parts; adjustable means for limiting the movement of the stream splitting means in one direction, the said stream splitting means being movable in the other direction to a non-splitting position in which all seed passes back to the lower part of the reservoir; means including parts movable by the propulsion of the apparatus for moving the stream splitting means to-and-from the two described positions; and means for leading to a sowing position one part of the flow of seed.

9. In seeding apparatus adapted to be propelled over the ground the combination of a rotary seed reservoir; means whereby, as the apparatus is propelled seed is picked up from the bottom of the reservoir and dropped from the top in a continuous stream; movable means within the reservoir adapted to split the falling stream of seed into two parts and adjustable to vary the ratio of the flow in the two parts, the flow control means being movable to and from its adjusted or open position; means including parts rotating about the axis of the reservoir for moving the flow control means alternately to and from its adjusted or open position; and means for leading one part of the flow of seed to a sowing position.

10. In seeding apparatus adapted to be propelled over the ground the combination of a rotary seed reservoir; means whereby, as the apparatus is propelled seed is picked up from the bottom of the reservoir and dropped from the top in a continuous stream; movable means within the reservoir for intercepting more or less of the falling seed; means operable by the rotary reservoir for moving said movable means to and from an intercepting position; and means for leading seed so intercepted to a sowing position.

11. In seeding apparatus adapted to be propelled over the ground the combination of a rotary seed reservoir; means whereby, as the apparatus is propelled seed is picked up from the bottom of the reservoir and dropped from the top in a continuous stream; movable means within the reservoir for intercepting more or less of the falling seed; means for automatically moving said movable means to and from an intercepting position as the apparatus is propelled; and means for leading seed so intercepted to a sowing position.

12. In seeding apparatus adapted to be propelled over the ground the combination of a rotary seed reservoir; means whereby, as the apparatus is propelled seed is picked up from the bottom of the reservoir and dropped from the top in a continuous stream; movable means within the reservoir for intercepting more or less of the falling seed; means for automatically moving said movable means to and from an intercepting position as the apparatus is propelled; means for varying the spacing of said movements relative to the movement of the apparatus; and means for leading seed so intercepted to a sowing position.

13. Seeding apparatus according to claim 1 in which the adjusting means for the flow control means comprises a shaft journalled in a stationary part and to which shaft the flow control means is secured; a rock arm secured to the shaft; an adjustable stop engageable by the rock arm to limit the open position of the flow control; a spring; means for tensioning the spring adapted to yieldingly hold the rock arm in engagement with the stop; and means for alternately moving the flow control means to and from its adjusted or open position comprising a second rock arm loose on the shaft, a spring operating connection between the second rock arm and shaft, and means for actuating the said second rock arm to move the flow control means towards the adjusted or open position including parts rotating about the axis of the reservoir, the hereinbefore mentioned spring tensioning means being adapted to tension the co-related spring to tend to move the flow control means towards the closed position.

14. Seeding apparatus according to claim 1 in which the adjusting means for the flow control means comprises a shaft journalled in a stationary part and to which shaft the flow control means is secured; a rock arm secured to the shaft; an adjustable stop engageable by the rock arm to limit the open position of the flow control; a spring; means for tensioning the spring adapted to yieldingly hold the rock arm in engagement with the stop; and means for alternately moving the flow control means to and from its adjusted or open position comprising a second rock arm loose on the shaft, a spring operating connection between the second rock arm and shaft, and means for actuating the said second rock arm to move the flow control means towards the adjusted or open position including a lever fulcrumed at one end on a stationary part and bearing at its other end against the second rock arm to actuate the latter to rock the shaft, and parts rotating about the axis of the reservoir adapted as the reservoir rotates to engage the lever and rock the second rock arm, the hereinbefore mentioned spring tensioning means being adapted to tension the co-related spring to tend to move the flow control means towards the closed position.

15. In seeding apparatus adapted to be propelled over the ground the combination of a rotary seed reservoir; means whereby, as the apparatus is propelled seed is picked up from the bottom of the reservoir and dropped from the top in a continuous stream; movable means within the reservoir adapted to split the falling stream of seed into two parts and adjustable to vary the ratio of the flow in the two parts, the flow control means being movable to and from its adjusted or open position; means for moving the flow control means to and from its adjusted or open position as the apparatus is propelled; and means for throwing the last mentioned means out of action when the apparatus is to be used in drill sowing.

ELIAS A. W. BEEMER.